Feb. 20, 1968     A. VAN DER LELY     3,369,647

ROTATABLE EJECTOR MEMBERS

Filed Feb. 9, 1966

INVENTOR
ARY VAN DER LELY
BY
Mason, Mason & Albright
Attorneys

United States Patent Office 3,369,647
Patented Feb. 20, 1968

3,369,647
ROTATABLE EJECTOR MEMBERS
Ary van der Lely, 10 Weverskade,
Maasland, Netherlands
Filed Feb. 9, 1966, Ser. No. 526,292
Claims priority, application Netherlands, Mar. 3, 1965, 65—2,651
1 Claim. (Cl. 198—128)

ABSTRACT OF THE DISCLOSURE

The ejector disc of this invention is mounted to rotate about a substantially vertical axis. Distributor arms are mounted on the substantially horizontal disc to extend gently upwardly from the disc's center. The distributor arms have two curved portions, one portion nearest the center of the disc being convex in the direction of rotation and the other portion being oppositely curved.

---

This invention relates to a rotatable ejector member intended for use in a device for spreading granular or powdery material, such as a fertilizer spreader.

In accordance with the invention there is provided a rotatable ejector member for use in a device for spreading granular or powdery material, such as a fertilizer spreader, said member comprising a plate, distribution arms on said plate for spreading said material, each distribution arm having two curved portions, one of which portions is arranged to have a rearwardly disposed center of curvature with respect to the intended direction of rotation of the ejector member and the other of which portions is arranged to have a forwardly disposed center of curvature with respect to said intended direction of rotation.

Figure 1:
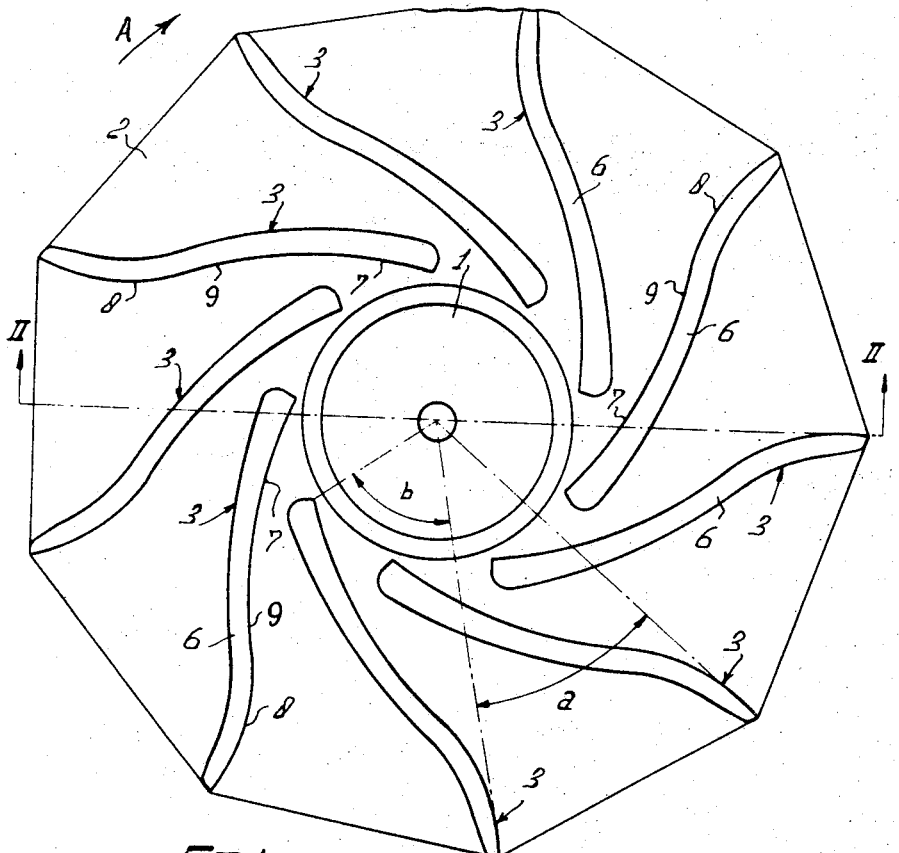
Figure 2:
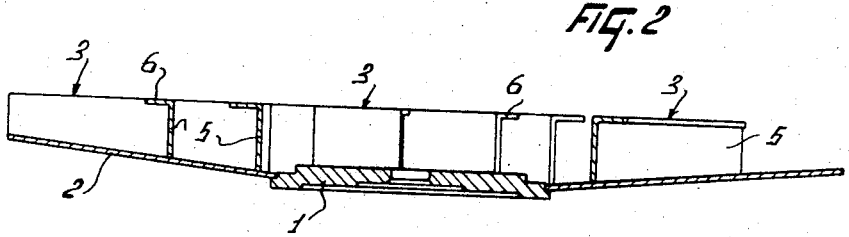

For a better understanding of the invention and the method by which the same can be performed, reference will now be made, by way of example, to the accompanying drawings, in which:

FIGURE 1 is a plan view of an ejector member in accordance with the invention, and FIGURE 2 is a sectional view taken on the line II—II in FIGURE 1.

Referring now to the drawings, there is shown a rotatable ejector member intended for use in a device for spreading granular or powdery material, such as a fertilizer spreader. The ejector member comprises a hub mounted in a central portion 1 of the ejector and adapted to receive a driving shaft (not shown). It will be seen in FIG. 2 that the central portion 1 has a plate 2 secured thereto, the plate 2 extending outwardly from the portion 1 and also extending gently upwardly. The plate 2 therefore comprises a frusto-conical surface and extends over a distance greater than half the distance between the center of the ejector and the circumference of the ejector. Distribution arms 3 are arranged on the inner side of said conical surface and extend from near the central portion 1 towards the outer circumference of the plate 2. The distribution arms 3 are made up from strips which have upstanding limbs 5 which are arranged parallel to the axis of rotation of the ejector and limbs 6 which extend perpendicular to said axis of rotation. As mentioned previously, the plate 2 defines a conical surface and the distance between a plane containing the limbs 6 and a parallel plane (perpendicular to the axis of the cone) passing through the apex of such a cone is substantially constant throughout the lengths of the distribution arms 3. That is, as seen in FIG. 2, the arms 3 decrease in height with distance from the center of the ejector.

The shape of the distribution arms 3 is shown clearly in FIG. 1. Each arm 3 comprises two curved portions 7 and 8 which merge into each other at a point of inflection 9. Each portion 7 extends outwardly from the central portion 1 and is so shaped and arranged that its center of curvature is located rearwardly thereof with respect to the intended direction of rotation A of the ejector during operation. The curvature of each arm 3 changes at the point 9 and each portion 8 is so shaped and arranged that its center of curvature is located forwardly thereof with respect to the intended direction of rotation A.

Nine distribution arms 3 are provided and each arm extends to a corresponding apex of a regular nonagon formed by the plate 2. The radius of curvature of the portion 7 of each arm 3 is about equal to the distance between the center of the ejector and any of the apices of the nonagon which equals the radius of the circle of center, the center of the ejector and passing through all the apices. The radius of curvature of the portion 8 is about half the radius of said circle containing the plate 2. Each point of inflection 9 is located at a distance from the center of the ejector which is greater than half the radius of said circle containing the apices of the plate 2. The number of distribution arms 3 is preferably greater than 4 and, as mentioned above, nine distribution arms 3 are provided in the embodiment described. Hence the circumferential angle $a$ between the ends of two adjacent arms is about 40°. The angle $b$ subtended by the two ends of each arm 3 at the center of the ejector is at least 60° and in this case about 66°. The plate 2 is rectilinear or straight between the outer ends of the distribution arms 3 at its circumference whereas the outer ends of the arms 3 extend substantially radially with respect to the center of the ejector. The operation of the ejector member will now be described.

The ejector member can be arranged on a driving shaft in a device for spreading granular or powdery material, such as a fertilizer spreader. The driving shaft can be driven by the ground wheels of the device or from the power take-off shaft of a tractor or the like propelling the device. The material to be spread is fed to the distribution arms 3 in the region of the central portion 1 in a direction perpendicular to the axis of rotation of the ejector, the ejector being disposed horizontally with its axis of rotation substantially vertical. The ejector is driven in the direction of the arrow A and the material flows outwardly from the central portion 1 against the upright limbs 5 of the arms 3. The particular arrangement of portions 7 and 8 and the conical shape of the plate 2 co-operating with the arms 3 are such that a substantially constant uniform flow of material along the arms 3 from the hub to the outside of the ejector is obtained. Also a substantially uniform distribution of material on the ground is obtained thus giving more uniform growth of crop and better utilization of material.

What I claim is:

1. A rotatable ejector member for use in a device for spreading granular or powdery material, such as a fertilizer spreader, said member comprising a plate mounted on said device so as to be rotatable about a substantially vertical axis of rotation, distributing arms mounted on said plate for spreading said material, each distributing arm having a forwardly extending flange at the top thereof, said distributing arm being L-shaped in cross-section whereby the height of the cross-section of each distributing arm decreases towards the outer end of said arm, each distributing arm having two curved portions one of said portions being located closer to the center of the ejector member than the other of said curved portions, the said one portion having a rearwardly disposed center of curvature with respect to the intended direction of rotation of the ejector member and the said other portion having a forwardly disposed center of curvature with respect to the said intended direction of rotation, the radius of curvature of one of said two portions being greater than the radius of curvature of said other portion, said plate comprising a center portion extending perpendicular to the axis of rotation and the roots of the distributing arms extending from adjacent the circumference of this center portion of the plate, the distributing arms being connected to a conical plate extending gently upwardly from the circumference of the said center portion.

References Cited

UNITED STATES PATENTS

| | | | |
|---|---|---|---|
| 640,606 | 1/1900 | Walls | 275—12 |
| 716,268 | 12/1902 | McPhee | 198—128 |
| 1,096,011 | 5/1914 | Beckwith et al. | 275—8 X |
| 1,098,603 | 6/1914 | Weigel | 275—15 |
| 2,192,802 | 3/1940 | Pound | 198—128 |
| 2,600,167 | 6/1952 | Jones | 275—8 |
| 2,967,604 | 1/1961 | Topp | 198—128 |

FOREIGN PATENTS

| | | |
|---|---|---|
| 24,724 | 6/1919 | Denmark. |
| 165,050 | 3/1903 | Germany. |

RICHARD E. AEGERTER, *Primary Examiner.*

EVON C. BLUNK, *Examiner.*

M. L. AJEMAN, *Assistant Examiner.*